United States Patent [19]

Saunders

[11] 3,753,456

[45] Aug. 21, 1973

[54] TRACTION DEVICE FOR AUTOMOBILE WHEELS

[75] Inventor: Marvelle Saunders, Springfield, Mo.

[73] Assignee: The Union National Bank of Springfield, Springfield, Mo.

[22] Filed: Mar. 22, 1972

[21] Appl. No.: 237,116

[52] U.S. Cl. .............................................. 152/225
[51] Int. Cl. ............................................ B60c 27/04
[58] Field of Search ................... 152/185, 208, 214, 152/225–230, 216

[56] References Cited
UNITED STATES PATENTS

| | | | |
|---|---|---|---|
| 3,117,612 | 1/1964 | Minutilla | 152/225 |
| 2,873,783 | 2/1959 | O'Higgins | 152/225 |
| 3,190,335 | 6/1965 | Isaacman | 152/216 |
| 2,730,406 | 1/1956 | Fitzgerald | 152/216 |

*Primary Examiner*—Drayton E. Hoffman
*Assistant Examiner*—Richard A. Bertsch
*Attorney*—Robert B. Larson, William R. Hinds et al.

[57] ABSTRACT

A traction device for automobile wheels comprises a circular frame member having an inner mounting portion formed with apertures to receive conventional lug bolts of a wheel assembly to secure the traction device to the wheel assembly, and a plurality of L-shaped traction bars reciprocably mounted in radial through-bores adjacent the periphery of the frame, the outer arms of the traction bars extending axially over the outer tread surface of the pneumatic tire of the wheel assembly. The traction bars are resiliently biassed outwardly, and are adjustably positioned radially by threaded nuts on the inner ends of the bars where they project from the through-bores. The bars are thus easily removable, and are relatively free to reciprocate radially with flexing of the tire.

7 Claims, 3 Drawing Figures

3,753,456

TRACTION DEVICE FOR AUTOMOBILE WHEELS

FIELD OF THE INVENTION

This invention relates to mountable traction devices for automobile wheels, and particularly to such traction devices including a frame portion mountable on the wheel by conventional lug bolts and nuts, and provided with removable traction members for embracing the peripheral surface of the tire of the wheel assembly.

BACKGROUND AND SUMMARY OF THE INVENTION

There have been previously proposed in the art various traction devices for use with automobile and truck tires on snow-covered or icy streets, and in mud or sand, for increasing the traction of the tires. Exemplary of such previously proposed devices are those shown in U.S. Pat. No. 2,598,851 (Spevak), U.S. Pat. No. 3,093,180 (Jones), and U.S. Pat. No. 2,730,406 (Figzgerald). However, it does not appear that prior devices of this general type have enjoyed any substantial degree of acceptance, for various reasons which need not be enumerated here. My invention involves what I consider to be an improved traction device of the same general type as disclosed in these prior patents, but with improved features which are believed to overcome or avoid many of the disadvantages of prior devices, and at the same time of simple and reliable construction, contributing to economy of manufacture and use.

Basically then, it is an object of this invention to provide a traction device, primarily for emergency use, characterized by its simplicity of construction and use, reliability, and economy.

Basically, my invention comprises a frame member of generally circular configuration having an inner mounting portion formed with apertures to receive conventional lug bolts of an automobile wheel and axle assembly, whereby the frame member can be readily secured to and removed from such a wheel assembly. When mounted, the periphery of the frame member is spaced inwardly from the outer periphery of the pneumatic tire and lies closely adjacent the axially outer surface of the wheel assembly. A plurality of radial through-bores are formed in the peripheral portion of the frame member, and a corresponding plurality of generally L-shaped friction bars are provided, each bar having one arm of its L-shape passing freely through its corresponding through-bore so as to be radially reciprocable therein, and having the other arm of its L-shape extending axially so as to overlie the outer peripheral surface of the pneumatic tire. Resilient means, preferably a spring or rubber-like bushing, urge each bar radially outwardly, and an adjustable stop member limits the radially outward movement of each bar, whereby when mounted on a wheel assembly the bars can reciprocate radially relative to the frame upon radial flexing of the pneumatic tire. Preferably the adjustable stop is provided by a threaded nut on the inner threaded end of a traction bar where the inner threaded end projects radially inwardly from the radially inner end of its through-bore. When not needed, the traction bars can be readily removed simply by removing the threaded nuts, and reinstallation is equally as simple, not requiring any removal of the wheel or lifting of the automobile on which it may be mounted. Preferably the frame member is of unitary construction, and has a plurality of axially projecting bosses on its axially outer side adjacent its periphery, the through-bores being formed in these bosses. The frame member preferably is formed as an outer peripheral ring and an inner mounting ring, the inner mounting ring being axially displaced relative to the outer strip and connected thereto through spider arms, whereby the inner mounting ring will abut or lie closely adjacent the lug bolt area of the automobile wheel. The threaded nuts, of course, are easily adjustable to regulate the tightness with which the traction bars abut the outer tread surface of the pneumatic tire.

Other and further objects, advantages and features of my invention will be apparent to those skilled in the art from the ensuing description of a preferred embodiment, taken in conjunction with the accompanying illustrations.

DESCRIPTION OF THE PREFERRED EMBODIMENT

Figure 1:
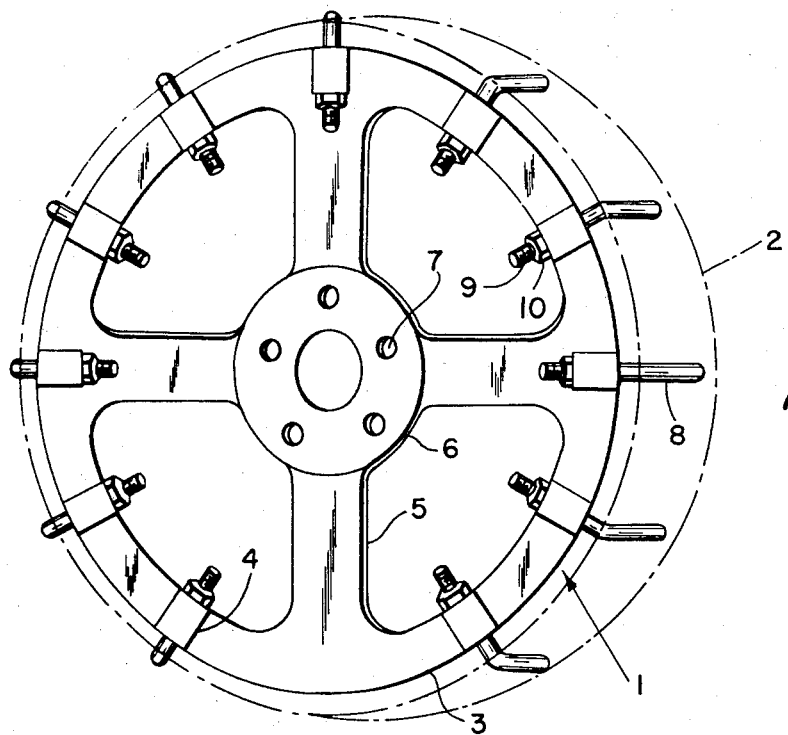
FIG. 1 is a perspective view of a preferred embodiment of the invention as it would appear in relation to a pneumatic tire when mounted on a wheel assembly, the pneumatic tire being shown in broken lines.
Figure 2:
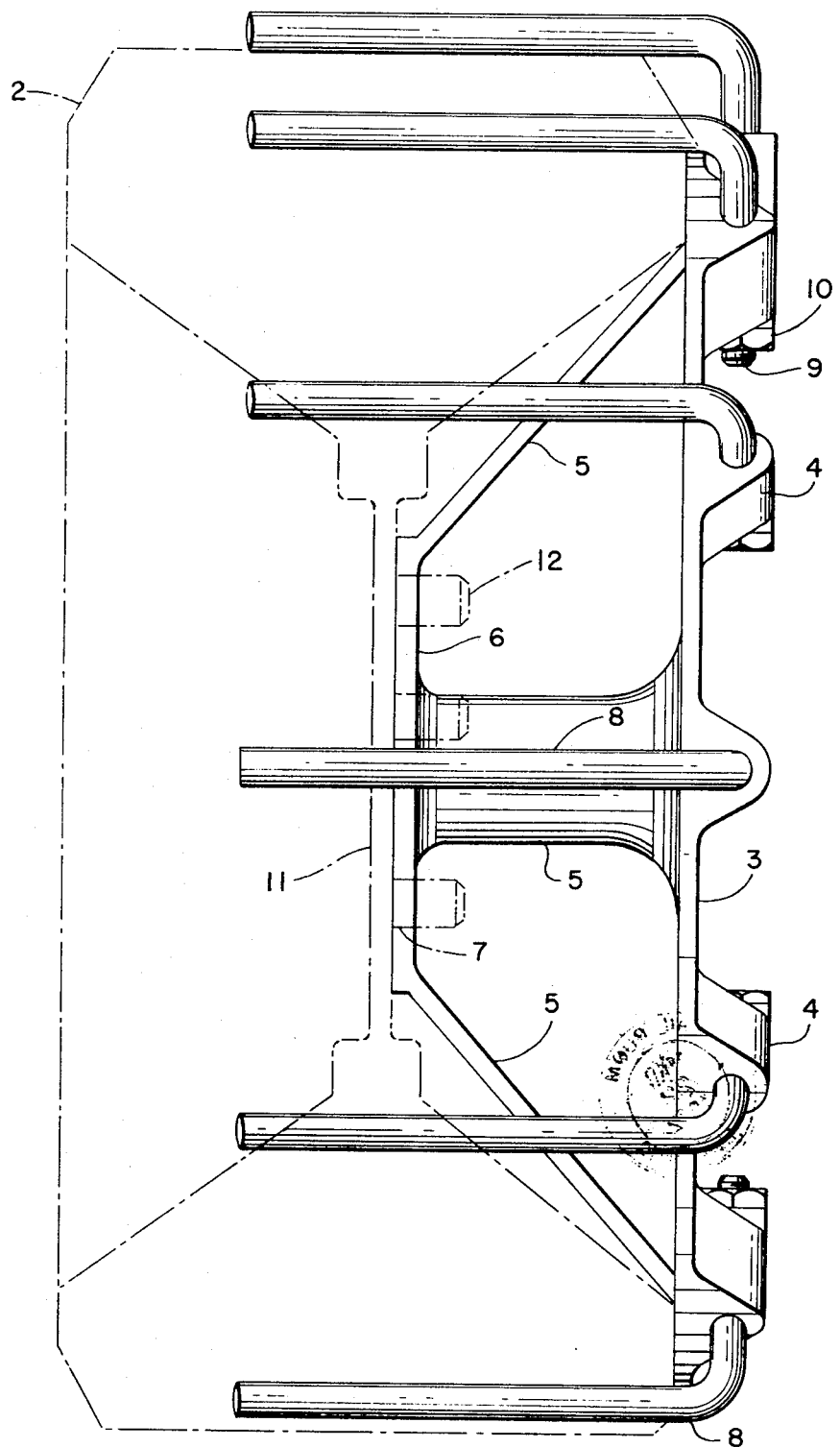
FIG. 2 is a side elevation of the embodiment of FIG. 1 as mounted on a wheel assembly, the tire and rim of the wheel assembly being shown in broken lines, as are the lug bolts of the automobile axle.

Referring to the drawings a traction device in accordance with a preferred embodiment of the invention is designated generally by reference character 1, and is shown in FIG. 1 as it would appear in relation to a pneumatic automobile tire shown diagrammatically in broken lines at 2. Traction device 1 comprises an outer peripheral ring 3, an inner mounting ring 6, and connecting spider arms 5. Mounting ring 6 is formed with apertures 7 to mate with and receive conventional lug bolts used for mounting a wheel assembly on an automobile axle, such lug bolts being illustrated schematically in broken lines at 12 in FIG. 2. As shown in FIG. 2, mounting ring 6 is displaced axially inwardly toward the wheel assembly relative to the other ring 3, so that the mounting ring 6 abuts or lies closely adjacent the central portion 11 of the wheel assembly rim. It will be apparent that the traction device is mounted to a wheel assembly simply by positioning it so that the lug bolts 12 pass through the apertures 7, after which the device is secured in place along with the wheel assembly by tightening conventional lug nuts on the lug bolts. As shown schematically in FIG. 2, the outer peripheral ring lies closely adjacent the axially outer surface of the wheel assembly when mounted.

A plurality of circumferentially spaced bosses 4 are formed on the axially outer face of the peripheral ring 3, and each boss 4 carries an L-shaped traction bar 8, the outer arms of which overlie the tread surface of the tire 2 so as to provide traction in snow, ice, sand, mud, etc. The entire frame of the device preferably is of unitary construction, that is, integral throughout, and the bosses 4 preferably are formed on the peripheral ring 3 during a casting or machining process.

Figure 3:
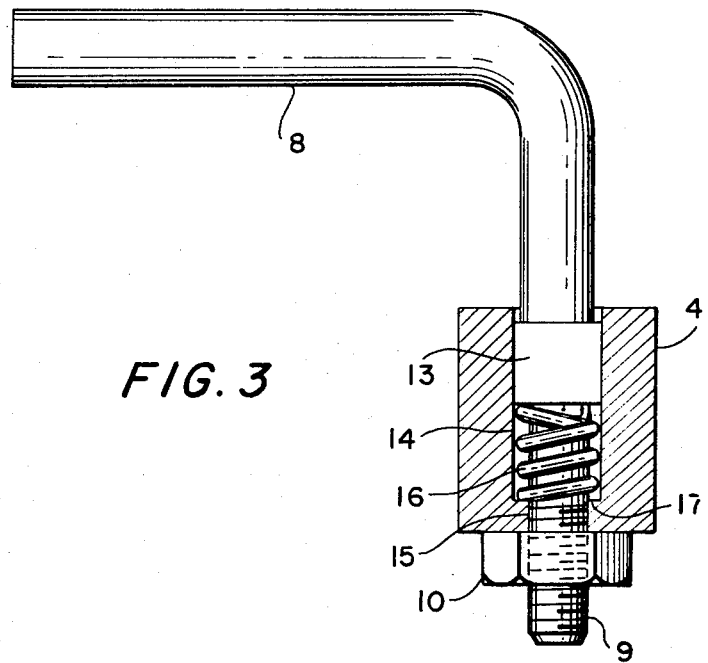
FIG. 3 is a side view, partially in section, of one of the traction bars as mounted in a through-bore in a boss forming part of the frame of the device.

As shown more clearly in FIG. 3, each boss 4 has formed therein a stepped through-bore 14, 15, separated by a radially outwardly facing shoulder 17. Traction bar 8 is provided intermediate its radial arm with an enlarged portion 13 which is freely slidable in bore 14, and at least part of the radial arm below enlarged part 13 is threaded, as indicated at 9. Threaded arm 9 passes through bore 15 with sufficient clearance so as to be freely movable therethrough, despite the threaded surface. A compression ring 16 is disposed in bore 14 surrounding the arm of bar 8 therein, and urges bar 8 radially outwardly. The radially outward movement of traction bar 8 is adjustably limited by threaded nut 10 on threaded arm portion 9. It will thus be clear that traction bar 8 is free to reciprocate radially within limits imposed by nut 10 and enlarged part 13. Of course, traction bar 8 normally assumes its radially outermost position as permitted by the adjustment of nut 10, and normally each nut 10 is adjusted so as to press the axial arm of its bar 8 very firmly against the unflexed external tread of the tire.

It will be understood that once the frame member has been mounted on a wheel assembly, it can be left thereon indefinitely. When the traction bars 8 are not required, they can be quickly and easily removed. Reinstallation is equally as fast and simple. It will be understood also that enlarged part 13 and bore 14 are of corresponding non-circular cross-sections (square, for instance) so as to prevent any possibility of a traction bar rotating about its radial arm such that the axially extending arm would be rotated away from the tread surface.

In use, any substantial radial flexing of the tire will result in a corresponding reciprocation of the traction bars, although normally such reciprocation will be relatively slight. However, should the tire encounter an obstacle that causes substantial flexing, the traction bar or bars affected thereby are free to reciprocate inwardly, as opposed to some prior art devices in which the traction bar itself is required to flex or bend. Because of the freedom to reciprocate, it is believed that my device provides a smoother ride with less "thump" from the traction bars.

Although I do not consider it to be necessary in most constructions of my invention, lug bolt extensions could be used in mounting my device on wheel assemblies where the normal lug bolts are not sufficiently long. Exemplary such extensions or extenders are known in the art, and are shown, for instance, in previously mentioned U.S. Pat. Nos. 2,598,851, and No. 3,093,180.

Should reciprocatory noise be a problem in the illustrated embodiment, rubber members or rubberized coatings could be provided at appropriate points. For instance, a rubber coating or a rubber-like bushing could be incorporated between nut 10 and the radially inner surface of the corresponding boss 4.

Having thus described an embodiment of my invention in the manner required by the patent statutes, it is to be understood that the illustrated preferred embodiment is exemplary rather than limiting, and that the scope of my invention is as defined in the subjoined claims, viewed in the light of the foregoing description and accompanying illustrations.

I claim:

1. A traction device for pneumatic automotive wheel assemblies of the rim and tire type, comprising a frame member of generally circular configuration having an inner mounting portion formed with apertures to receive lug bolts which secure the wheel assembly to a vehicle axle whereby the frame member can be removably secured to the wheel assembly through the lug bolts and cooperating lug nuts, with the periphery of the frame member spaced inwardly from the outer periphery of the pneumatic tire and closely adjacent the axially outer surface of the wheel assembly; a plurality of radial through-bores formed in the peripheral portion of said frame member; a plurality of generally L-shaped friction bars, one bar for each bore, and each bar having one arm of its L-shape threaded over at least its radially inner portion and passing freely through its corresponding bore so as to be radially reciprocable therein, and having the other arm of its L-shape extending axially so as to overlie the outer peripheral surface of the1 pneumatic tire of a wheel assembly when mounted thereon; resilient means urging each bar radially outwardly; each said one arm of each bar having a radially inwardly facing shoulder formed thereon intermediate its length, and each said through-bore having a radially outwardly facing shoulder formed therein, and said resilient means comprising a resilient compression member in each through-bore between and abutting said shoulders; and adjustable stop means comprising a threaded nut screwed into said radially inner portion of each bar arm where it projects inwardly from its through-bore for limiting the radially outward movement of each bar; whereby, when mounted on a wheel assembly, said other arms of said bars will over-lie the outer periphery of the pnuematic tire and the bars can reciprocate radially relative to said frame upon radial flexing of the pneumatic tire.

2. A traction device as claimed in claim 1 wherein said resilient means comprises a compression spring in each said through-bore surrounding the bar arm therein.

3. A traction device as claimed in claim 1 wherein said frame member has a plurality of axially projecting bosses on its axially outer side adjacent its periphery, and said through-bores are formed in said bosses.

4. A traction device as claimed in claim 3 wherein said frame member comprises a peripheral ring portion formed with said bosses, an inner mounting ring formed with said lug bolt receiving apertures, and a plurality of spider arms interconnecting the inner and outer rings.

5. A traction device as claimed in claim 4 wherein said inner mounting ring is displaced axially inwardly so as to abut the inner lug-receiving portion of a wheel assembly when mounted thereto, while the peripheral ring portion lies closely adjacent the axially outer surface of the wheel assembly.

6. A traction device as claimed in claim 1 wherein each through-bore is of stepped configuration, the radially outer portion thereof being of larger diameter than the radially inner portion and separated therefrom by said shoulder, and wherein said threaded portion of the corresponding bar passes freely through and projects inwardly from said inner portion of the through-bore to receive said nut.

7. A traction device as claimed in claim 6 wherein the inner arm of each bar has a relatively enlarged portion disposed in and freely slidable in the large diameter portion of its through-bore, the bar being removable radially outwardly upon removal of said nut.

* * * * *